US008029757B2

(12) United States Patent
Lee et al.

(10) Patent No.: US 8,029,757 B2
(45) Date of Patent: Oct. 4, 2011

(54) METHOD OF CUTTING CARBON NANOTUBES

(75) Inventors: Jeong-hee Lee, Yongin-si (KR); Seok-gwang Doo, Yongin-si (KR); Dong-min Im, Yongin-si (KR); Shang-hyeun Park, Yongin-si (KR); Tae-won Jeong, Yongin-si (KR); Jeong-na Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 672 days.

(21) Appl. No.: 11/583,358

(22) Filed: Oct. 18, 2006

(65) Prior Publication Data

US 2007/0158622 A1 Jul. 12, 2007

(30) Foreign Application Priority Data

Oct. 18, 2005 (KR) .................. 10-2005-0098224
Jan. 27, 2006 (KR) .................. 10-2006-0009011

(51) Int. Cl.
*D01F 9/12* (2006.01)
*B02C 19/00* (2006.01)
(52) U.S. Cl. ..................... 423/447.1; 241/22
(58) Field of Classification Search ............... 423/447.1, 423/447.2, 447.3; 419/32; 241/22; 252/500, 252/301.4 P; 502/182, 185
See application file for complete search history.

(56) References Cited

U.S. PATENT DOCUMENTS

| 6,250,984 B1 * | 6/2001 | Jin et al. ........................ 445/51 |
| 6,599,961 B1 * | 7/2003 | Pienkowski et al. .......... 523/120 |
| 6,872,403 B2 * | 3/2005 | Pienkowski et al. .......... 424/422 |
| 2004/0101466 A1 * | 5/2004 | Dillon et al. ............. 423/445 B |

FOREIGN PATENT DOCUMENTS

| CN | 1636869 A | 7/2005 |
| JP | 2003-261311 | 9/2003 |
| JP | 2005-082614 | 3/2005 |
| JP | 2005-194184 | 7/2005 |
| JP | 2005-219964 | 8/2005 |
| KR | 2003-0059128 | 7/2003 |
| KR | 10-2005-0037877 A | 4/2005 |
| KR | 10-2005-0072634 | 7/2005 |
| KR | 10-2005-0097088 | 10/2005 |
| WO | WO 02/20402 * | 3/2002 |
| WO | WO 02/20402 A1 | 3/2002 |

OTHER PUBLICATIONS

Pierard, et al., Production of short carbon nanotubes with open tips by ball milling, Chemical Physics Letters 2001; 335: 1-8.*
Wilczek, et al., Optimised technologies for cryogenic grinding, Int. J. Miner. Process. 2004; 74S: S425-S434.*

(Continued)

*Primary Examiner* — Daniel C. McCracken
(74) *Attorney, Agent, or Firm* — Christie, Parker & Hale, LLP

(57) ABSTRACT

Carbon nanotubes and metal particle-containing carbon nanotubes are provided. The carbon nanotubes have increased surface area. A method of cutting carbon nanotubes is also provided. According to the method, the dispersion properties of the carbon nanotubes are improved by simplifying the structural changes and/or surface modifications of the carbon nanotubes, thereby enabling insertion of an active substance into the inner walls of the carbon nanotubes and increasing the insertion efficiency.

11 Claims, 14 Drawing Sheets

OTHER PUBLICATIONS

Hirsch, et al., Functionalization of Carbon Nanotubes, Top Curr Chem 2005; 245: 193-197.*

Lee, et al., Short carbon nanotubes produced by cryogenic crushing, Carbon 2006; 44: 2984-2989.*

Iijima, et al., Structural flexibility of carbon nanotubes, J. Chem. Phys. 1996; 104(5): 2089-2092.*

Wilczek, et al., Optimised technologies for cryogenic grinding, Int. J. Miner. Process. 2004; 74S: S425-S434.*

Hardenburger, et al., Nitrogen "Abstract," Kirk-Othmer Encyclopedia of Chemical Technology, http://mrw.interscience.wiley.com/emrw/9780471238966/kirk/article/nitrhard.a01/current/abstract?hd=All,liquid&hd=All,nitrogen (posted May 13, 2005).*

Dyke, et al., Solvent-Free Funcitonalization of Carbon Nanotubes, J. Am. Chem. Soc. 2003; 125: 1156-1157.*

Zhang, et al., Plastic Deformations of Carbon Nanotubes, Physical Review Letters 1998; 91(24): 5346-5349.*

Robert H. Perry, Perry's Chemical Engineer's Handbook, p. 20-31 to 20-32 (Don W. Green ed., 7th ed., McGraw-Hill 1997).*

Robert H. Perry, Perry's Chemical Engineer's Handbook, p. 20-31 to 20-32 (Don W. Green ed., 7th ed., McGraw-Hill 1997).*

Korean Patent Abstracts, Publication No. 1020050072634 A, dated Jul. 12, 2005, in the name of Hyuk Chang et al.

Korean Patent Abstract, Publication No. 1020050097088 A, dated Oct. 7, 2005, in the name of Jong Moon et al.

Korean Patent Abstracts, Publication No. 1020050037877 A, dated Apr. 25, 2005, in the name of Seung Il Cha et al.

SIPO Office action dated Mar. 1, 2010, for corresponding Chinese Patent application 200610171895.0, with English translation, noting listed references in this IDS.

Li, Jurrtao., et al., *Study of the Field Emission Structure of Carbon Nanotubes*, Vacuum Electronics, No. 1, Feb. 28, 2003, pp. 15-17.

\* cited by examiner

METHOD OF CUTTING CARBON NANOTUBES

CROSS-REFERENCE TO RELATED PATENT APPLICATION

This application claims priority to and the benefit of Korean Patent Application No. 10-2005-0098224 filed on Oct. 18, 2005 in the Korean Intellectual Property Office and Korean Patent Application No. 10-2006-0009011 filed on Jan. 27, 2006 in the Korean Intellectual Property Office, the entire disclosures of which are incorporated herein by reference.

BACKGROUND OF THE INVENTION

1. Field of the Invention

The present invention relates to a method of cutting carbon nanotubes. More particularly, the invention is directed to a method of cutting carbon nanotubes which improves the dispersion properties of the carbon nanotubes by simplifying the structural change or surface modification of the carbon nanotubes, thereby enabling an active substance to be inserted into the inner walls of the carbon nanotubes and increasing catalyst support efficiency.

2. Description of the Related Art

Carbon nanotubes were first observed as a side product of a fullerene synthesis reaction. In general, carbon nanotubes consist of multiple layers (typically 2 to 50 layers) of smaller concentric carbon nanotubes capped at both ends. Such carbon nanotubes are formed from sheets of hexagonally or pentagonally arranged carbon atoms, and have hollow cores with diameters of up to 50 nm and lengths of 100 to 200 μm.

Carbon nanotubes can be produced in large scale by, for example, arc discharge, catalytic decomposition of hydrocarbons or laser ablation. Carbon nanotubes are known to have prominent mechanical and electrical properties such as electroconductivity, which is attributable to the unique crystalline structure and electron arrangement of the carbon nanotubes. These properties are a reason why carbon nanotubes are currently being heavily researched.

Carbon nanotubes can potentially be used in a variety of applications such as, for example, field emission, electrical and thermal conduction, catalyst support, hydrogen storage and molecular sieves. However, when used in applications such as catalyst support, hydrogen storage or molecular sieves, carbon nanotubes face dispersion difficulties due to van der Waals bonding attributable to characteristics of the one-dimensional structure of the carbon nanotubes. As a result, it has been difficult to efficiently utilize the large surface areas of carbon nanotubes. In order to overcome these problems, short carbon nanotubes having open ends have been used (i.e. production of short carbon nanotubes from long carbon nanotubes).

However, conventional methods of producing short carbon nanotubes, such as acid treatment, ball milling, etc., cause structural damage and surface damage to the carbon nanotubes, and result in a lesser yield of short carbon nanotubes. Since the production of short carbon nanotubes with good physical qualities is difficult and expensive, there is a need for a new, economical method of producing carbon nanotubes having higher conductivity.

SUMMARY OF THE INVENTION

In one embodiment of the present invention, a method is provided for producing short carbon nanotubes at reduced cost. The short carbon nanotubes contain less amorphous carbon, each nanotube having at least one open end, and having excellent dispersion properties.

In another embodiment of the present invention, carbon nanotubes are produced by the method.

In yet another embodiment of the present invention, a field emitter uses the carbon nanotubes produced by the method as a field emitting material.

In still another embodiment of the present invention, a catalyst support uses the carbon nanotubes produced by the method.

In still yet another embodiment of the present invention, a carbon nanotube composite material uses the carbon nanotubes produced by the method.

According to one embodiment of the present invention, a method of cutting carbon nanotubes comprises mechanically treating a carbon nanotube source material at a temperature of about 0° C. or lower. The source material may contain carbon nanotubes alone or a mixture of carbon nanotubes and metal particles.

According to another embodiment of the present invention, a field emitter comprises carbon nanotubes alone or metal particle-containing carbon nanotubes, either of which is obtained using the above cutting method.

According to yet another embodiment of the present invention, a catalyst support includes a catalyst metal supported by carbon nanotubes alone or by metal particle-containing carbon nanotubes, either of which is obtained using the above cutting method.

According to still another embodiment of the present invention, a carbon nanotube composite material comprises an active substance inserted into carbon nanotubes alone or into metal particle-containing carbon nanotubes, either of which is obtained using the above cutting method.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

In general, carbon nanotubes are flexible at room temperature. Thus, when they are subjected to simple mechanical treatment at room temperature, they are mashed (rather than crushed), thus forming amorphous carbon as shown in FIGS. 1a through 1d. As used herein, the term "crushed" means that the carbon nanotubes are broken into smaller nanotube segments which generally retain their nanotube structure. In contrast, the term "mashed" means that the carbon nanotubes are compressed such that the resulting product generally does not retain a nanotube structure, thereby producing large amounts of amorphous carbon. FIGS. 1a through 1d are scanning electron microscope (SEM) micrographs, taken at different times, of carbon nanotubes that have been subjected to ball milling at room temperature. This undesirably produces amorphous carbon having poor mechanical properties, surface properties and the like, as compared to the carbon nanotubes prior to the mechanical treatment.

Figure 1A:
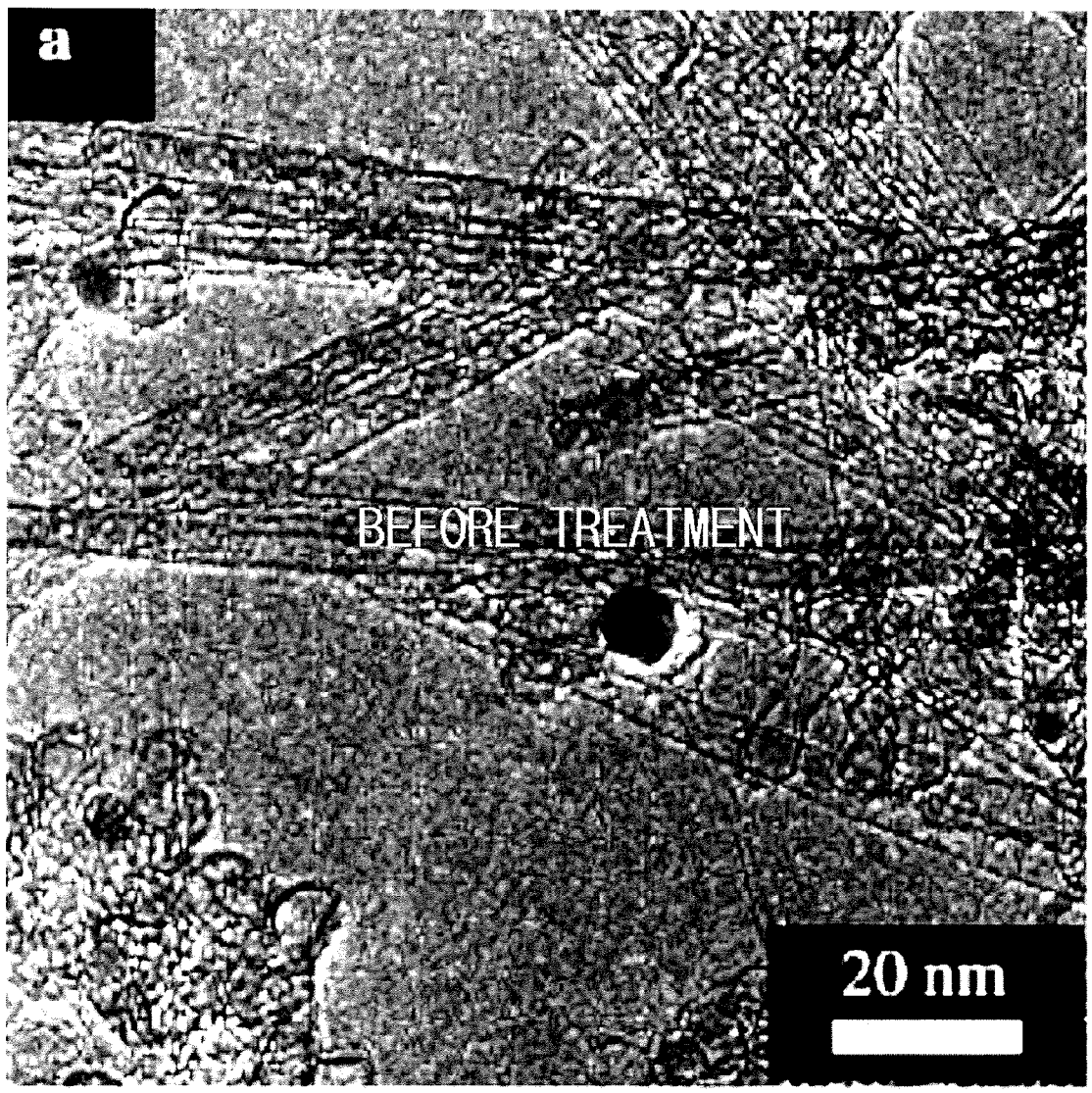
FIG. 1a is a scanning electron microscope (SEM) micrograph, taken of carbon nanotubes prior to subjecting the nanotubes to a prior art ball milling process at room temperature.
Figure 1B:
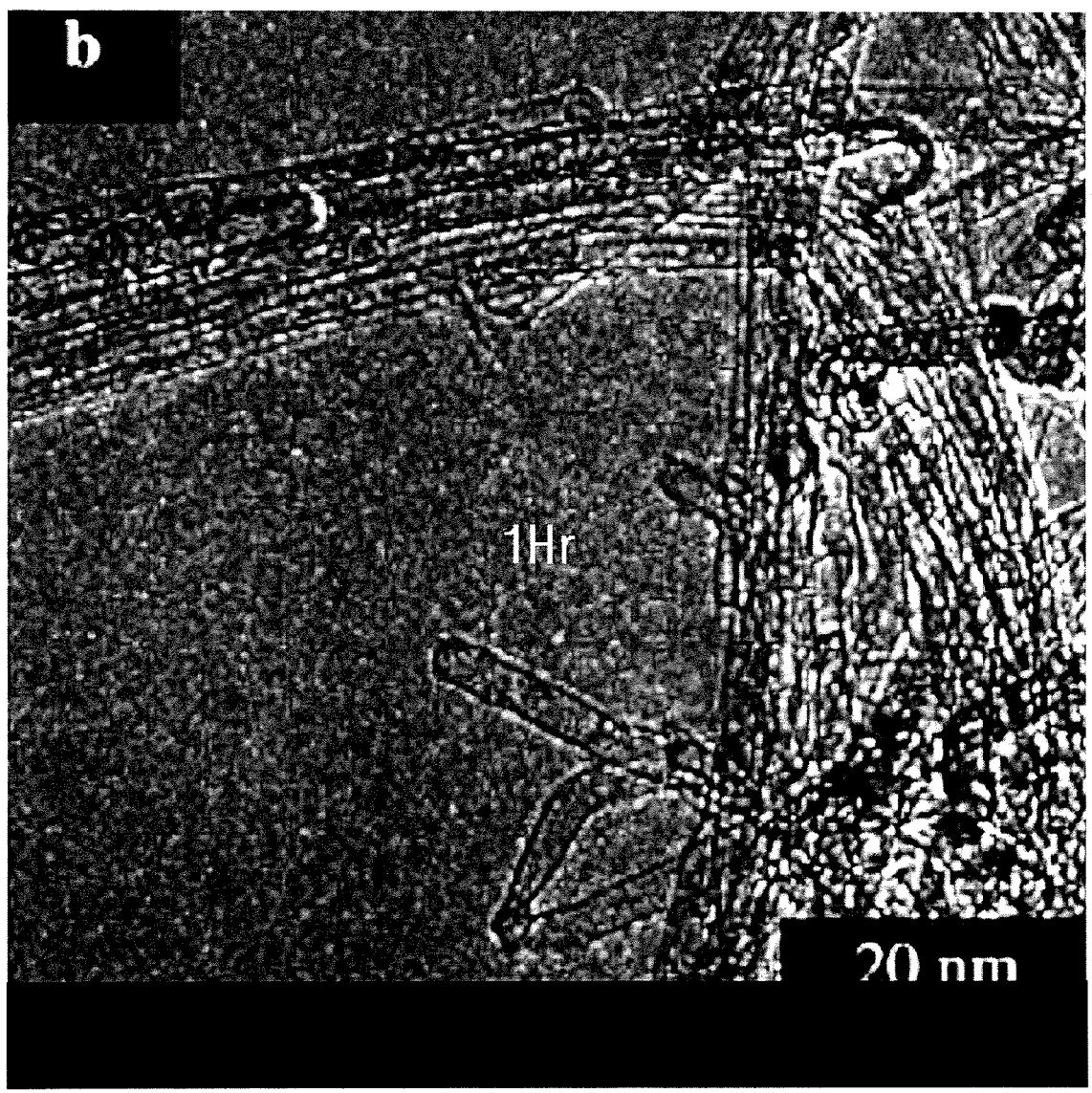
FIG. 1b is a SEM micrograph, taken of carbon nanotubes one hour after subjecting the nanotubes to a prior art ball milling process at room temperature.
Figure 1C:
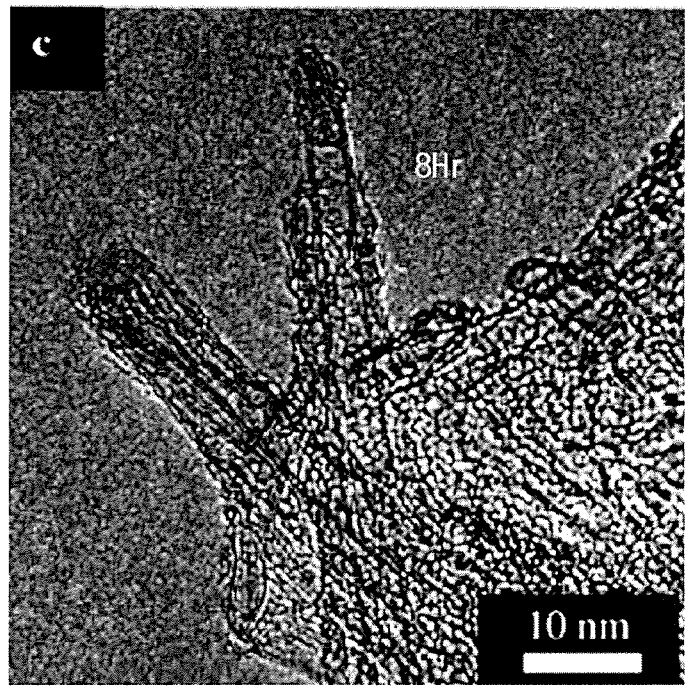
FIG. 1c is a SEM micrograph, taken of carbon nanotubes eight hours after subjecting the nanotubes to a prior art ball milling process at room temperature.
Figure 1D:
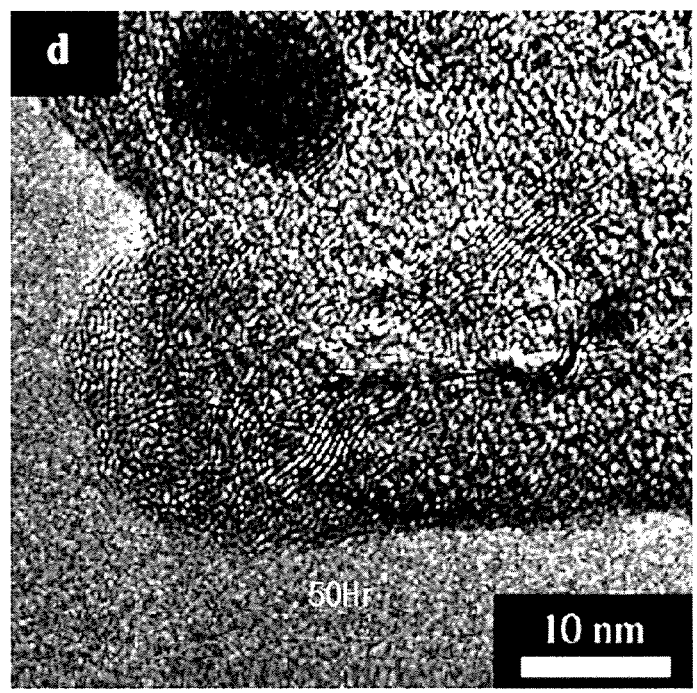
FIG. 1d is a SEM micrograph, taken of carbon nanotubes fifty hours after subjecting the nanotubes to a prior art ball milling process at room temperature.
Figure 2:
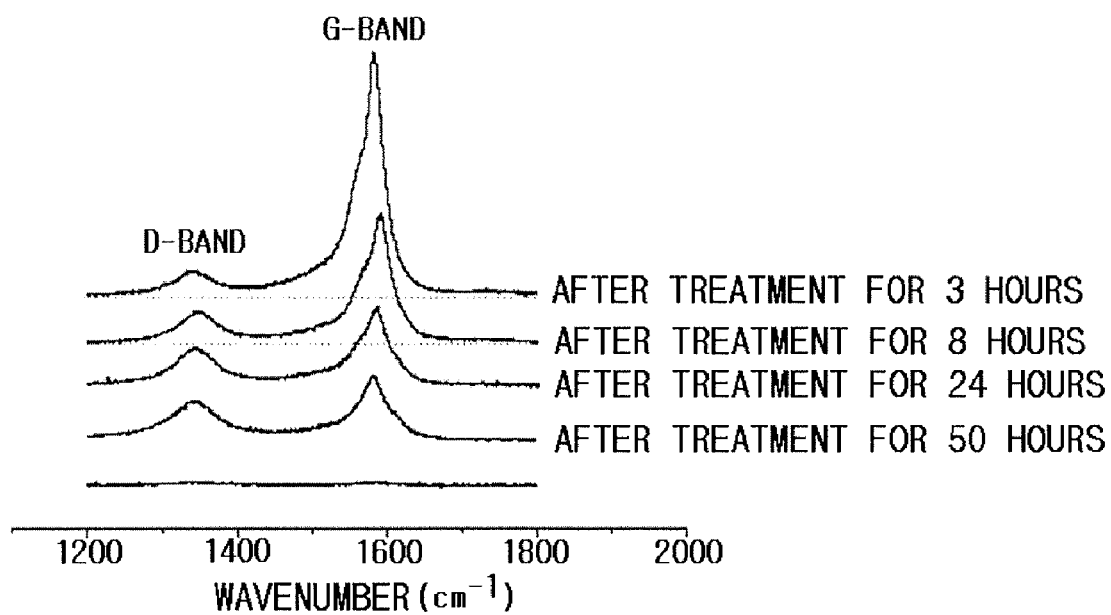
FIG. 2 is a graph depicting Raman spectra, measured at different times, of carbon nanotubes that have been subjected to a prior art ball milling process at room temperature.

According to one embodiment of the present invention, short carbon nanotubes are produced containing a reduced amount of amorphous carbon, wherein each nanotube has at least one open end. The amount of amorphous carbon can be determined by analysis of the Raman spectrum of the carbon nanotubes. As shown in FIG. 2, when comparing the initial carbon nanotubes and the carbon nanotubes after being subjected to ball milling at room temperature for 3 hours, the amount of amorphous carbon increases with crushing of the source material carbon nanotubes, and the D-band peak increases. Also, the G/D ratio in the Raman spectrum further decreases with increases in the ball milling treatment time. This implies that the amount of amorphous carbon gradually increases.

According to one embodiment of the present invention, the resulting carbon nanotubes are single-walled or multi-walled short carbon nanotubes in which each nanotube has at least one open end. The G/D ratio according to Raman spectrum analysis ranges from about 5 to about 10 for the single-walled carbon nanotubes, and ranges from about 1 to about 10 for the multi-walled carbon nanotubes. That is, short carbon nanotubes containing a reduced amount of amorphous carbon are provided. When the G/D ratio exceeds the above range, loss and/or structural modification of the carbon nanotubes used as the source material, as well as other undesirable problems may occur.

Taking into account the flexibility of the carbon nanotubes at room temperature, one embodiment of the present invention provides a method of reducing the generation of amorphous carbon and achieving structural changes and surface modifications of the carbon nanotubes more easily by mechanically treating the carbon nanotubes at low temperatures, for example, at cryogenic temperatures. Carbon nanotubes have higher rigidity at low temperatures than at ambient temperature. Thus, carbon nanotubes can be crushed to smaller pieces by mechanical treatment at low temperatures. Accordingly, it is possible to reduce the amount of amorphous carbon generated by mashing of the carbon nanotubes by mechanical treatment. Crushing the nanotubes according to the method of this embodiment results in reduced damage to the wall surfaces of the carbon nanotubes, and maintains high strength properties of the carbon nanotubes. There is virtually no impact on the electron arrangement of the carbon nanotubes, which is an inherent characteristic of the nanotubes. Thus, it is possible to more easily achieve structural changes and surface modifications of the carbon nanotubes.

According to one embodiment of the present invention, in order to improve the electrical conductivity and dispersion properties of the carbon nanotubes obtained through the low-temperature, mechanical treatment described above, metal particles are incorporated into the source material (along with carbon nanotubes) prior to the cutting process. Adding the metal particles prior to the cutting process allows the carbon nanotubes and the metal particles to be simultaneously subjected to the low-temperature, mechanical treatment, thereby providing metal particle-containing carbon nanotubes with improved electrical conductivity and dispersion properties.

According to another embodiment of the present invention, in order to obtain short carbon nanotubes in which each nanotube has at least one open end, the mechanical treatment can be performed at a temperature of about 0° C. or lower. In one embodiment, for example, the mechanical treatment is performed at a temperature of about −100° C. or lower. In another embodiment, the mechanical treatment is performed at a temperature ranging from about −100° C. to about −200° C. The carbon nanotubes or mixture of carbon nanotubes and metal particles may be chemically treated. When the temperature exceeds 0° C., the carbon nanotubes used as the source material have reduced rigidity and thus undesirably increased amounts of amorphous carbon. In one embodiment, in order to achieve such a low temperature, liquefied nitrogen, liquefied oxygen or the like can be used, in which case the temperature can reach about 77K. At this temperature, the rigidity of the carbon nanotube source material increases, and the carbon nanotubes can be crushed into smaller pieces by mechanical treatment, thus making it possible to produce the desired short carbon nanotubes.

According to one embodiment of the present invention, the carbon nanotube source material or the mixture of carbon nanotubes and metal particles may be crushed by mechanical treatment. Nonlimiting examples of suitable mechanical treatments include impact force generated by ball milling, shear force, friction force, compression force, cutting force, etc. For example, in one embodiment, impact force can be exerted by a ball milling apparatus containing solid particles. That is, after charging the carbon nanotube source material into the ball milling apparatus, the milling process is performed for a period of time sufficient to crush the carbon nanotubes into smaller pieces. Solid particles having particle sizes of at least 1 mm can be used in the ball milling apparatus, but particle size is not limited. The material used as the solid particles is not limited and any material known in the related art can be used.

The mechanical treatment processing time is an important factor in controlling the length of the resulting short carbon nanotubes. As the mechanical treatment processing time increases, the long carbon nanotubes can be crushed to even smaller sizes, thus further fragmenting the carbon nanotubes. The mechanical treatment processing time may range from about 0.1 to about 2 hours. When the processing time is less than about 0.1 hours, the source material (i.e. the long carbon nanotubes) cannot be sufficiently crushed. When the processing time exceeds about 2 hours, the economical benefit obtained by further crushing is insufficient. The mechanical treatment processing time may vary depending on the state of the carbon nanotube source material. That is, even though the final length of the desired short carbon nanotubes to be obtained should be equal, the carbon nanotubes in the source material may have different lengths and may require different mechanical treatment processing times to achieve the desired length of the short carbon nanotubes. Those skilled in the art would be able to determine the necessary mechanical treatment processing time. In addition, conventional ball milling treatments at ambient temperature are not easy and require long processing times to achieve adequate crushing. In contrast, according to the present invention, crushing can be easily achieved and does not require long processing times.

According to one embodiment of the present invention, the mechanical treatment can be performed continuously or non-continuously, but is not limited thereto.

According to one embodiment of the present invention, single-walled carbon nanotubes, double-walled carbon nanotubes or a mixture of these can be used. In one embodiment, long carbon nanotubes having bundle-based average lengths ranging from about 0.5 µm to about 500 µm can generally be used. Such long carbon nanotubes used in the source material can be directly subjected to mechanical treatment in their powdered state. The long carbon nanotubes can also be used in solution after being dissolved in an organic solvent such as alcohol, or in a dispersion after being dispersed in a solvent.

When the long carbon nanotubes described above are subjected to mechanical treatment, they are crushed to form short carbon nanotubes. The short carbon nanotubes generated according to one embodiment of the present invention may have an average length of about 1 µm or less. In one embodiment, for example, the short carbon nanotubes have an average length ranging from about 0.01 µm to about 1 µm. The average length of the short carbon nanotubes can be set to an appropriate length in accordance with the desired use, and their average length can be adjusted by appropriately controlling the mechanical treatment processing time as described above. It should be noted that even with short carbon nanotubes of equal length, the processing time may vary depending on the initial length of the long carbon nanotubes used in the source material.

In the present invention, carbon nanotubes may be used alone as the source material. Alternatively, a mixture of carbon nanotubes and metal particles can be used as the source material. Nonlimiting examples of suitable metal particles include conductive metals, such as Ag, Au, Pt, Pd, Ni, Fe, Cu, Zn, Ti, In, Al, Ge, and mixtures thereof, wherein the conductive metals have a diameter, for example, on a micrometer scale. Such conductive metals having diameters on a micrometer scale are mechanically treated with the carbon nanotubes at a low temperature and are ground. In other words, the mechanical treatment shortens the carbon nanotubes while simultaneously grinding the metal particles and reducing the sizes of the metal particles when the metal particles are used together with the carbon nanotubes. The metal particles having reduced sizes can easily adsorb onto the carbon nanotubes to improve dispersion properties in subsequent processes, such as in paste preparation processes.

In another embodiment, instead of the conductive metals having diameters on a micrometer scale, conductive metals having diameters on a nanometer scale can be used. However, conductive metals having diameters on a nanometer scale are difficult to efficiently grind by the mechanical treatment, and the cost of such conductive metals is high. Thus, metal particles having diameters on a micrometer scale are preferred over the more expensive metal particles having diameters on a nanometer scale. The micrometer scale metal particles are ground together with carbon nanotubes by the mechanical treatment to a particle size on a nanometer scale. When forming metal particles having an average diameter on a nanometer scale by the cutting process, the sizes of the metal particles used in the source material are not limited. However, in one embodiment, the metal particles used in the source material may have diameters on the micrometer scale, for example, the metal particles may have diameters ranging from about 0.01 to about 100 µm. In addition, the size of the metal particles used in the source material can be appropriately determined according to the average length of the carbon nanotubes to be formed, the initial lengths of the carbon nanotubes in the source material, the duration of the mechanical treatment, etc.

The short carbon nanotubes produced according to the present invention have excellent dispersion properties due to the reduced length of the carbon nanotubes and have excellent electrical conductivity due to the added metal particles having sizes on the nanometer scale. In one embodiment of the present invention, the electrical conductivity of the metal particle-containing carbon nanotubes is about 10 times greater than the electrical conductivity of carbon nanotubes not containing metal particles. Furthermore, expensive nano-sized metal particles are obtained by simply mechanically processing the micro-sized metal particles.

As described above, the metal-containing carbon nanotubes formed using the above-described method according to the present invention have improved electrical conductivity. They also have a sheet resistance of about 30 mΩ/square under a pressure of 100 kg/cm$^2$. In one embodiment, for example, the metal-containing carbon nanotubes have a sheet resistance ranging from about 5 to about 10 mΩ/square under a pressure of 100 kg/cm$^2$. The sheet resistance can be measured using a 4-probe method while pressing a disc-type mold having a diameter of 13 mm containing 0.05 g of the metal-containing carbon nanotubes. The metal-containing carbon nanotubes formed using the methods according to the present invention have excellent dispersion properties, as described above.

According to one embodiment of the present invention, in the presence of a reactant that is capable of chemically reacting with carbon nanotubes, functional groups can be introduced into the short carbon nanotubes that are obtained by mechanically treating the source material. This functionalization can provide various advantages. For example, the combination of carbon nanotubes and certain polymers can form composite materials attaining new structures for use in various technical fields. In addition, the functionalization can improve the physical and mechanical properties of the carbon nanotubes. For example, gas holding properties of the carbon nanotubes can be improved by restricting the natural aggregation of carbon nanotubes due to the van der Waals interaction. As a result, gases such as hydrogen and methane can be effectively adsorbed onto the external surfaces as well as the internal surfaces of the carbon nanotubes.

According to one embodiment, the mechanical treatment and functionalization can be simultaneously performed, thereby eliminating the need for additional processes. For example, the carbon source material may be mechanically treated in the presence of a reactant capable of chemically reacting with carbon nanotubes, and the reactant capable of chemically reacting with carbon nanotubes introduces a functional group to the carbon nanotubes of the carbon nanotube source material.

Nonlimiting examples of functional groups that can be introduced to the short carbon nanotubes through the use of the above reactants include —SH, —$NH_2$, —NHCO, —OH, —COOH, —F, —Br, —Cl, —I, —NRH, —OR, —S—R, —CO, —COCl and —SOCl, wherein R is an alkyl group or an aryl group.

As described above, the short carbon nanotubes (whether functionalized or not functionalized) obtained using the methods of cutting carbon nanotubes according to the present invention, can be utilized in various fields. For example, the short carbon nanotubes can be used as field emitters, electric and thermal conductors, hydrogen storage devices, catalyst supports or molecular sieves.

In one embodiment, the short carbon nanotubes are used as field emitters. A field emitter can be obtained using metal-containing carbon nanotubes or carbon nanotubes not containing metals using the cutting methods according to the present invention. In particular, a field emitter may be manufactured by coating a conductive material on a substrate, coating the carbon nanotubes obtained using an inventive cutting method on the conductive material, thermally treating the coated carbon nanotubes, and treating the surfaces of the carbon nanotubes according to a method using ultrasonic waves, adhesive tape, or the like. Such field emitters can be used in various display devices, for example, in field emission display devices.

According to another embodiment of the present invention, the metal-containing carbon nanotubes obtained using the inventive cutting methods can be used for catalyst supports. For example, a catalyst support may be prepared by adsorbing catalytic metal ions (such as platinum and/or ruthenium ions) onto the carbon nanotubes, and reducing the catalytic metal ions so that the catalytic metal (for example platinum or a platinum/ruthenium alloy) is supported in the carbon nanotubes. A nonlimiting example of a suitable source for platinum ions includes $H_2PtCl_6$, and a nonlimiting example of a suitable source for ruthenium ions includes $RuCl_3$. The proton concentration of the platinum solution should be fixed to a pH of about 8 using NaOH or the like. A carbon paper (gas diffusion layer) can be coated with a colloidal dispersion of a polymer electrolyte by washing while stirring, and then dried to provide an electrode for a polymer electrolyte-type fuel cell or a direct methanol-type fuel cell.

In addition, a variety of carbon nanotube composite materials can be prepared by inserting (encapsulating) various active substances into the inner walls of the metal-containing carbon nanotubes or the carbon nanotubes not containing metal obtained according to the present invention. That is, it is possible to change the physical properties of the carbon nanotubes, form new materials, and transport the inserted active substances. Nonlimiting examples of active substances that can be inserted into the inner walls of the carbon nanotubes include fullerene, DNAs, oligonucleotides, aptamers, PNAs (peptide nucleic acids), antibodies, antigens, enzymes, proteins, antibiotics, hormones, RNAs, cells, metals, quantum dots and drugs.

Hereinafter, the present invention will be described with reference to the following examples. These examples are presented for illustrative purpose only and are not intended to limit the scope of the invention.

Example 1

0.1 g of a powder of single-walled carbon nanotubes having an average length of 3 μm was introduced into a ball milling apparatus (Cryogenic Sample Crusher, Model JFC-1500, Japan Analytical Industry Co., Ltd., Japan) and was continuously subjected to cryogenic ball milling treatment for 10 minutes at a temperature of 77 K (achieved by use of liquefied nitrogen) in order to crush the carbon nanotubes. Thus, short carbon nanotubes in which each nanotube had at least one open end and an average length of 1 μm were obtained.

Figure 3:
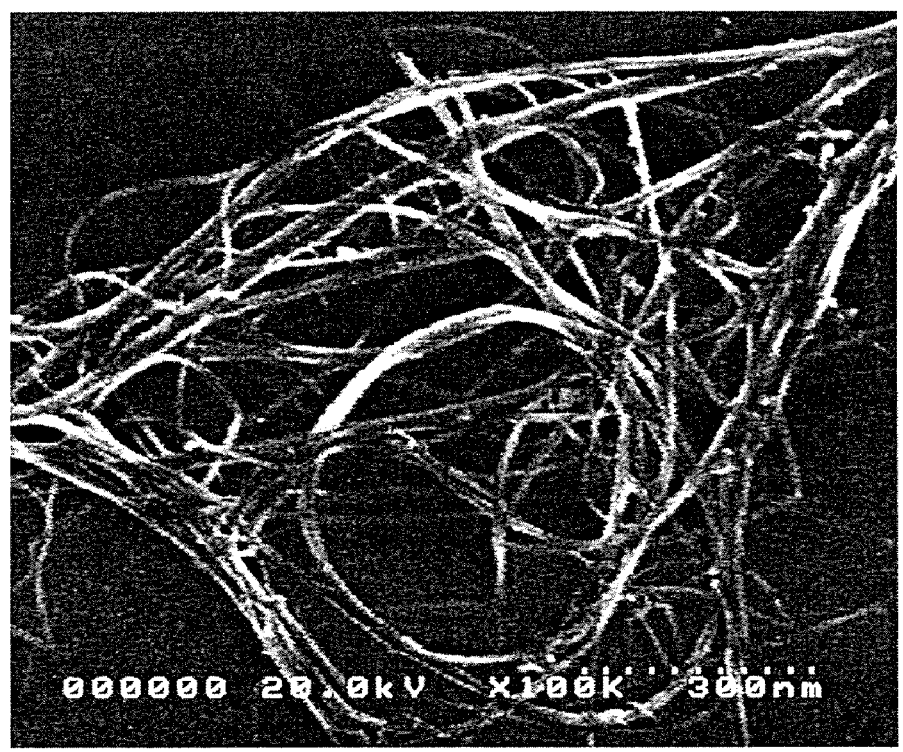
FIG. 3 is a SEM micrograph showing the initial state of the single-walled carbon nanotubes prepared according to Example 1.
Figure 4:
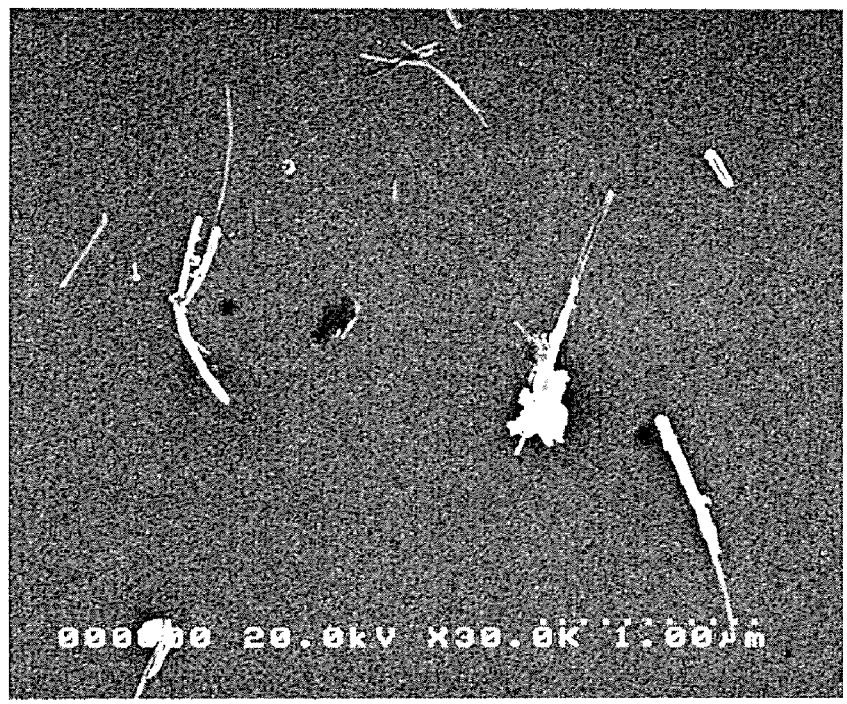
FIG. 4 is a SEM micrograph showing the state of the single-walled, short carbon nanotubes prepared according to Example 1 after cryogenic ball milling.

FIG. 3 is a scanning electron microscope (SEM) micrograph of the single-walled carbon nanotubes used as the source material in Example 1, while FIG. 4 is a SEM micrograph of the short carbon nanotubes obtained after performing a cryogenic crushing process for 10 minutes. From FIGS. 3 and 4, it can be seen that long carbon nanotubes were converted to short carbon nanotubes, with the formation of amorphous carbon being minimized.

Example 2

0.1 g of a powder of multi-walled carbon nanotubes having an average length of 3 μm was introduced into a ball milling apparatus (Cryogenic Sample Crusher, Model JFC-1500; Japan Analytical Industry Co. Ltd., Japan) and was continuously subjected to cryogenic ball milling treatment for 10 minutes at a temperature of 77 K (achieved by use of liquefied nitrogen) in order to crush the carbon nanotubes. Thus, short carbon nanotubes in which each nanotube had at least one open end and having an average length of 0.25 μm were obtained.

Figure 5:
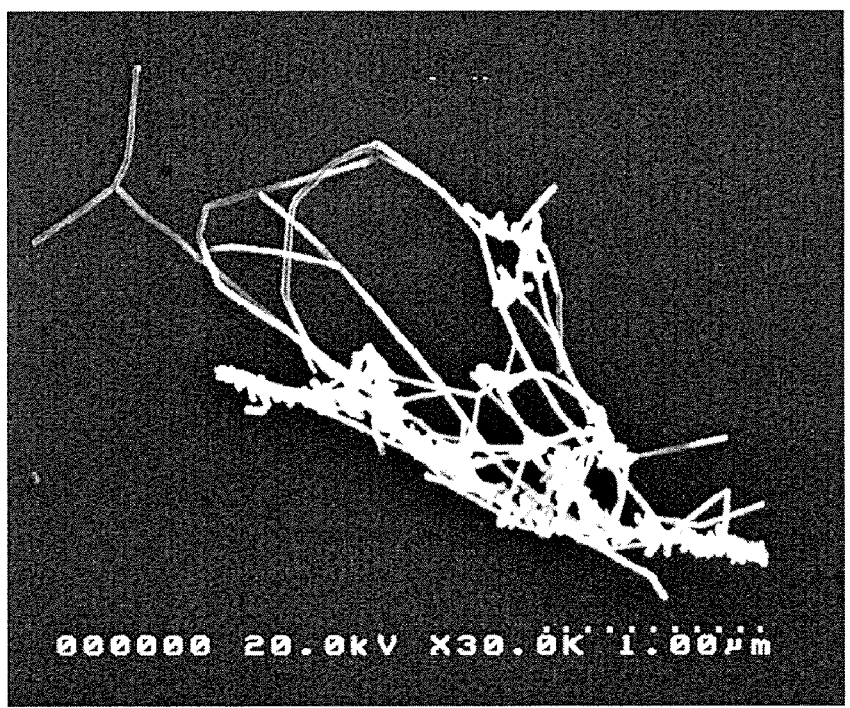
FIG. 5 is a SEM micrograph showing the initial state of the multi-walled carbon nanotubes prepared according to Example 2.
Figure 6:
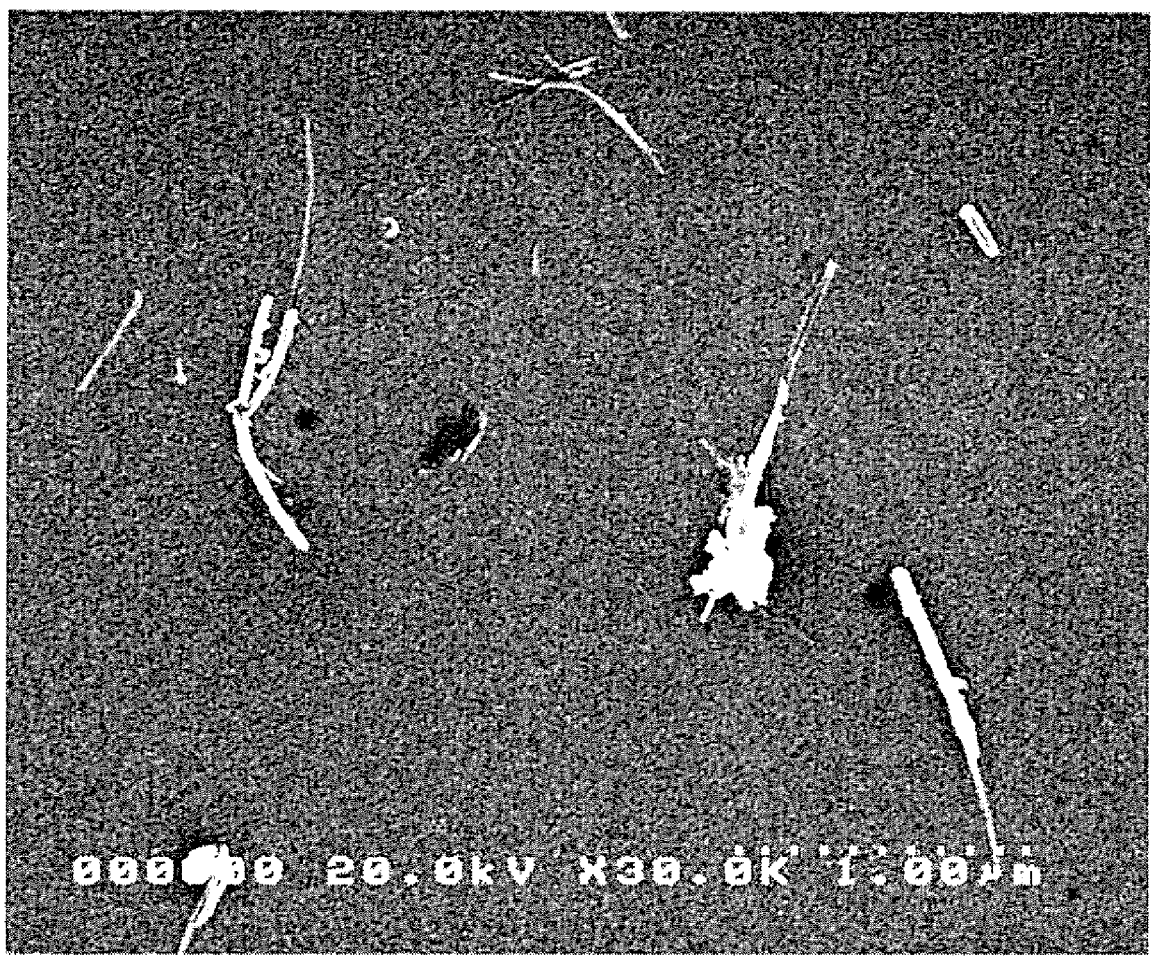
FIG. 6 is a SEM micrograph showing the state of the multi-walled, short carbon nanotubes prepared according to Example 2 after cryogenic ball milling.

FIG. 5 is a SEM micrograph of the multi-walled carbon nanotubes used as the source material in Example 2, while FIG. 6 is a SEM micrograph of the short carbon nanotubes obtained after performing a cryogenic crushing process for 10 minutes. From FIGS. 5 and 6, it can be seen that long carbon nanotubes were converted to short carbon nanotubes, with the formation of amorphous carbon being minimized.

Example 3

A mixture of 50 mg of a powder of single-walled carbon nanotubes having an average length of 10 μM and 250 mg of Ag metal particles having a diameter of 5 μwas introduced into a ball milling apparatus (Cryogenic Sample Crusher, Model JFC-1500; Japan Analytical Industry Co., Ltd., Japan) and was continuously subjected to ball milling for 10 minutes at a temperature of 77 K (achieved by use of liquefied nitrogen) in order to crush the carbon nanotubes and metal particles. Thus, a mixture of short carbon nanotubes in which each nanotube had at least one open end and having an average length of 1 μM and Ag metal particles having a size of about 33 nm was obtained.

Figure 7:
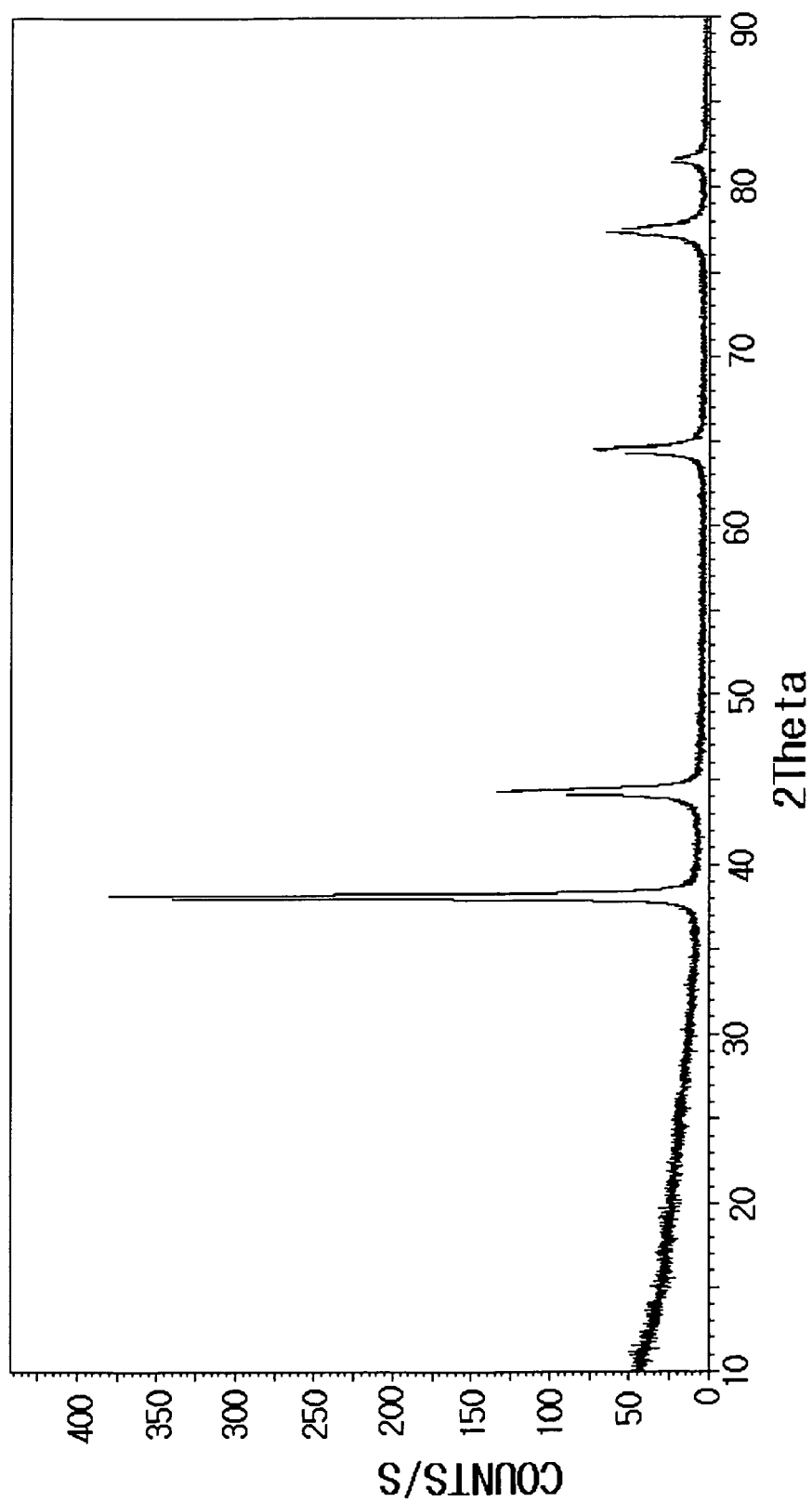
FIG. 7 is a X-ray diffraction (XRD) spectrum taken after low-temperature ball milling of a mixture of single-walled carbon nanotubes and metal particles (Ag) prepared according to Example 3.

FIG. 7 illustrates the results of X-Ray Diffraction (XRD) performed after the low-temperature milling. The results in FIG. 7 show that the Ag metal particles have a size of 330 Å.

Comparative Example 1

A powder of single-walled carbon nanotubes having an average length of 3 μm was not subjected to cryogenic ball milling treatment, and was compared with the short single-walled carbon nanotubes obtained in Example 1.

Comparative Example 2

A powder of multi-walled carbon nanotubes having an average length of 3 μm was not subjected to cryogenic ball milling treatment, and was compared with the short multi-walled carbon nanotubes obtained in Example 2.

Comparative Example 3

Five sets of short carbon nanotubes were obtained as in Example 1, except that ball milling treatment was performed at room temperature rather than at 77 K, with the durations of the ball milling treatment being 0 hours, 3 hours, 8 hours, 24 hours and 50 hours.

Experimental Example 1

Figure 8:
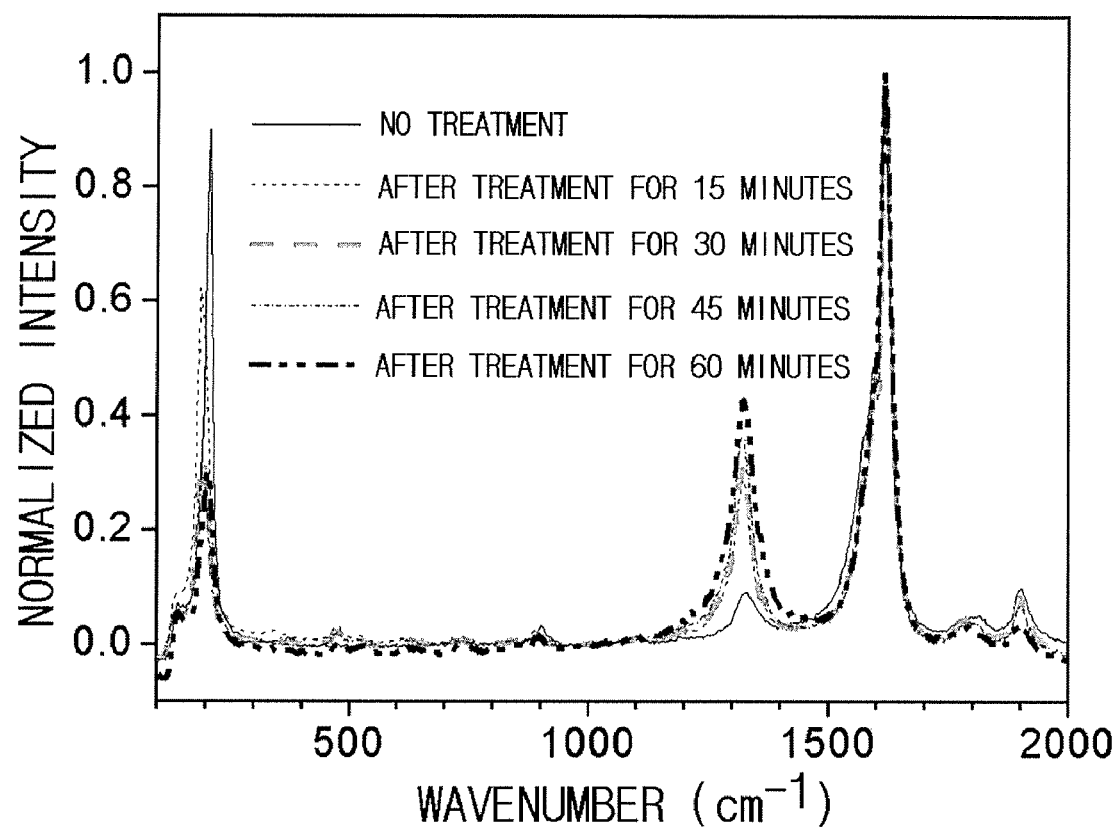
FIG. 8 is a set of radial breathing mode (RBM) Raman spectra, measured at different times, of short carbon nanotubes prepared according to Experimental Example 1.

Five sets of short carbon nanotubes were obtained as in Example 1, except that the duration of the cryogenic ball milling treatment was varied (i.e. 0 minutes, 15 minutes, 30 minutes, 45 minutes and 60 minutes) and purified single-walled carbon nanotube (SWCNT) powder was produced by an arc-discharge method. The short carbon nanotubes were analyzed by Renishaw Raman spectroscopy, and the Raman spectra obtained are presented in FIG. 8. As shown in FIG. 8, the D-band peak increases with the duration of the cryogenic ball milling treatment. This implies that the amount of amorphous carbon contained in the obtained short carbon nanotubes increases as the duration of the cryogenic ball milling treatment increases.

Experimental Example 2

Figure 9:
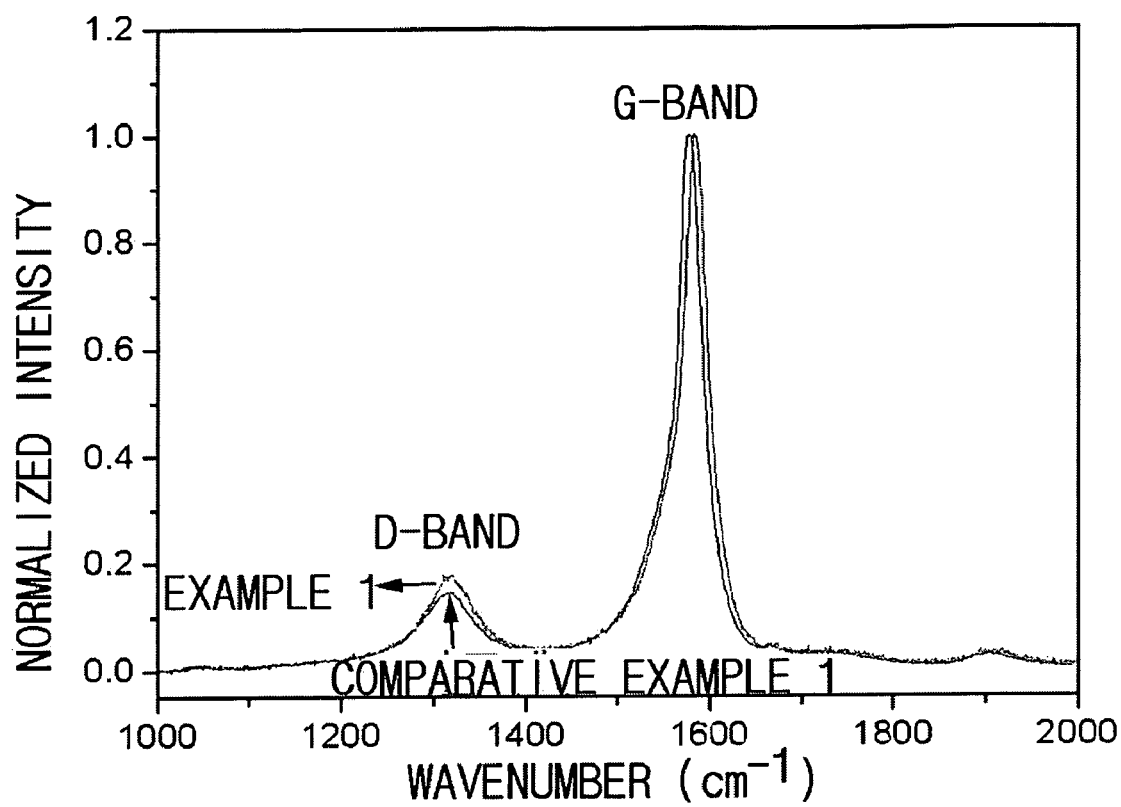
FIG. 9 is a comparison of Raman spectra of the carbon nanotubes prepared according to Example 1 and Comparative Example 1.

The carbon nanotubes obtained in Example 1 and Comparative Example 1 above were analyzed by Renishaw Raman spectroscopy, and the Raman spectra obtained therefrom are presented in FIG. 9. As shown in FIG. 9, the short carbon nanotubes obtained in Example 1 show an increase in the D-band peak and consequently a decrease in the G/D ratio. That is, it was found that in the short carbon nanotubes obtained in Example 1, the G/D ratio decreased from an initial value of 7.1 to a value of 5.6 after the cryogenic ball milling treatment. This represents a decrease of about 79% of the initial value, as compared with the long carbon nanotubes of Comparative Example 1 which had not been subjected to cryogenic ball milling treatment.

On the other hand, in the short carbon nanotubes of Comparative Example 3 (which were obtained after a ball milling treatment process performed at room temperature), as shown in FIG. 2, the D-band peak increased after 3 hours of treatment, and the G/D ratio decreased from an initial value of 8 to a value of 4. This represents a G/D ratio decrease of 50% of the initial value. It is believed that in the ball milling treatment performed at room temperature, the carbon nanotubes in the source material are mashed, rather than being broken into smaller fragments. As a result, the amount of amorphous carbon increases.

Experimental Example 3

Figure 10:
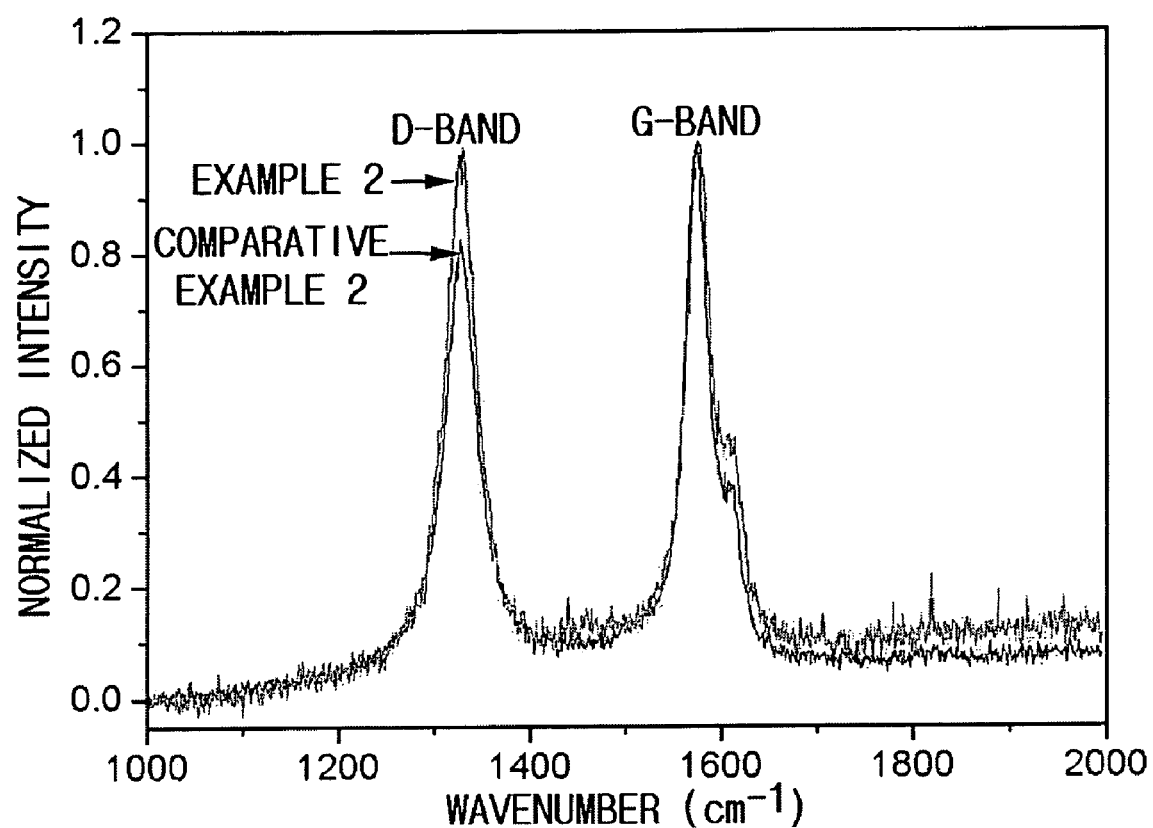
FIG. 10 is a comparison of Raman spectra of the carbon nanotubes prepared according to Example 2 and Comparative Example 2.

The carbon nanotubes obtained in Example 2 and Comparative Example 2 were analyzed by Renishaw Raman spectroscopy, and the Raman spectra obtained therefrom are presented in FIG. 10. As shown in FIG. 10, the short carbon nanotubes obtained in Example 2 show an increase in the D-band peak and consequently a decrease in the G/D ratio. In the short carbon nanotubes of Example 2, the G/D ratio decreased from 1.25 to 1 after the cryogenic ball milling treatment, representing a decrease of about 80% of the initial value, a smaller decrease than that of Comparative Example 2, where a cryogenic ball milling treatment was not performed. This implies that the carbon nanotubes in the source material were broken into smaller fragments rather than being mashed, thereby being converted to short carbon nanotubes.

Experimental Example 4

The long carbon nanotubes in the source material (both single-walled and multi-walled) were subjected to the same process as that of Example 1, except that the conditions of the cryogenic ball milling treatment were as indicated in Table 1 below. The particle size and specific surface area of the nanotubes were measured and the results are shown in Table 1.

TABLE 1

| | Particle Size Analysis at pH = 8 | | Specific Surface Area | |
|---|---|---|---|---|
| | Average Length (nm) | Ratio Compared to the Initial Value (%) | BET ($m^2/g$) | Increase Ratio (%) |
| Single-walled carbon nanotubes (no ball milling treatment) | 2945 | — | 717 | — |
| Single-walled carbon nanotubes (10 min of cryogenic ball milling treatment) | 2245 | 76 | 817 | 14 |
| Single-walled carbon nanotubes (20 min of cryogenic ball milling treatment) | 836 | 28 | — | — |
| Multi-walled carbon nanotubes (no ball milling treatment) | 698 | — | 44 | — |

TABLE 1-continued

Particle Size Analysis at pH = 8

|  | Ratio Compared | Specific Surface Area | |
| --- | --- | --- | --- |
| Average Length (nm) | to the Initial Value (%) | BET ($m^2/g$) | Increase Ratio (%) |
| Multi-walled carbon nanotubes (1 min of cryogenic ball milling treatment) | — | — | 57 | 30 |
| Multi-walled carbon nanotubes (5 min of cryogenic ball milling treatment) | 321 | 46 | 63 | 43 |
| Multi-walled carbon nanotubes (10 min of cryogenic ball milling treatment) | 248 | 36 | 76 | 73 |

As can be seen from Table 1, the cryogenic ball milling treatment according to one embodiment of the present invention leads to a decrease in the particle size and an increase in the specific surface area.

Example 4

A field emitter was prepared using the Ag-metal particle-containing short carbon nanotubes obtained in Example 3.

A conductive material was coated on an indium tin oxide (ITO) substrate, and the Ag-metal particle-containing carbon nanotubes were coated on the conductive material and thermally treated at 500° C. Next, the surfaces of the Ag-metal particle-containing carbon nanotubes were treated using ultrasonic waves, thereby completing a field emitter.

Example 5

A catalyst support was produced using the short carbon nanotubes obtained in Example 1 in which each nanotube had at least one open end.

First, 0.25 g of the short carbon nanotubes was added to 100 ml of distilled water and 100 ml of ethylene glycol, and the mixture was subjected to ultrasonic dispersion. A platinum precursor solution was added to the dispersion, and the resulting mixture was stirred at 110° C. to reduce the platinum precursor. Subsequently, the mixture was washed, filtered and dried in vacuum at 80° C. for 24 hours to produce Pt/CNT (carbon nanotube).

Figure 11:
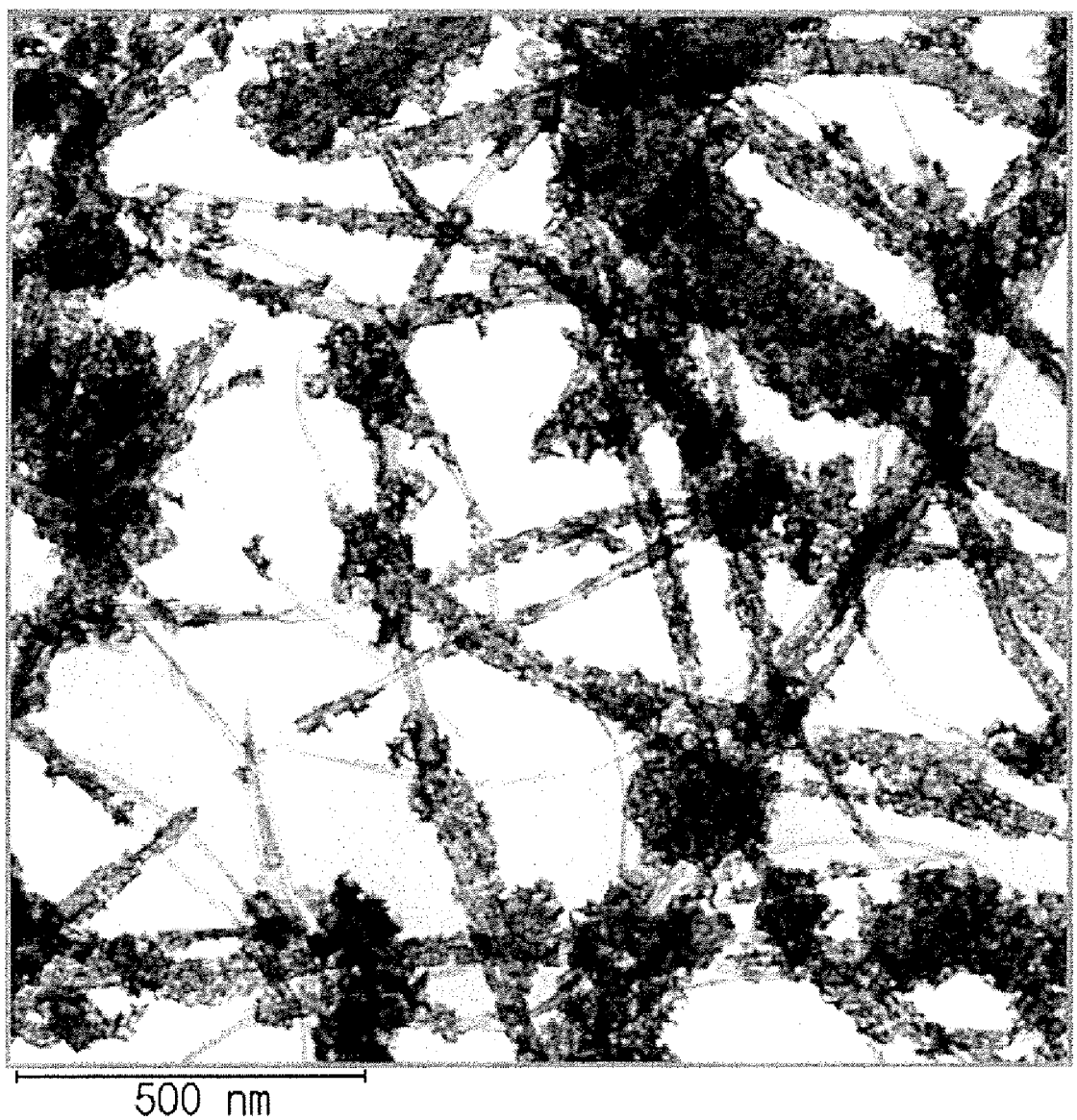
FIG. 11 is a transmission electron microscope (TEM) micrograph of a catalyst support prepared according to Example 5.
Figure 12A:
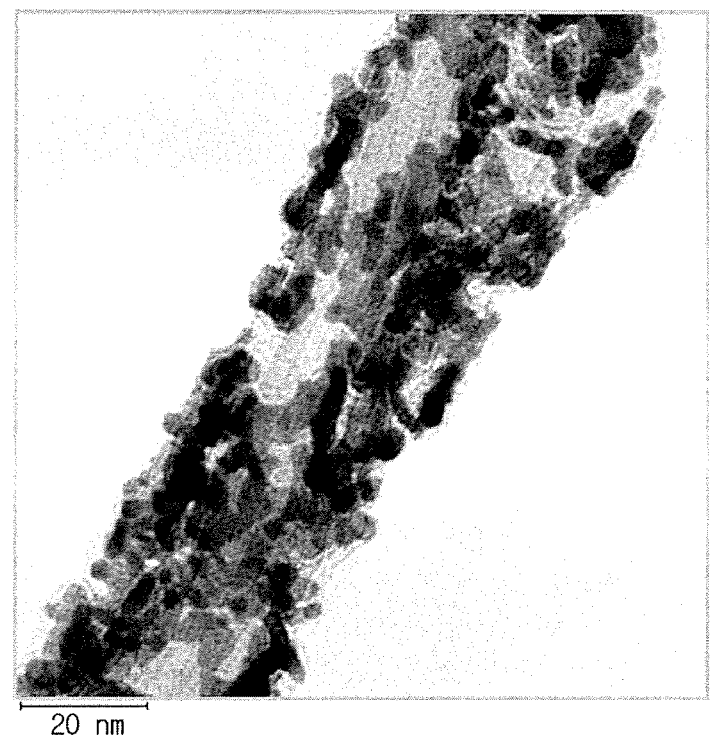
FIG. 12a is a partial magnification of the TEM micrograph of FIG. 11.
Figure 12B:
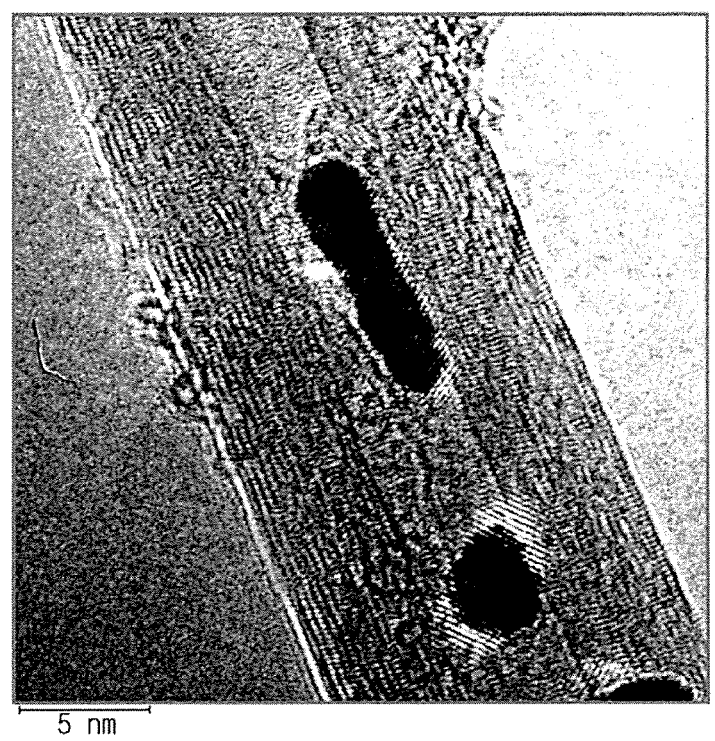
FIG. 12b is another partial magnification of the TEM micrograph of FIG. 11.
Figure 12C:
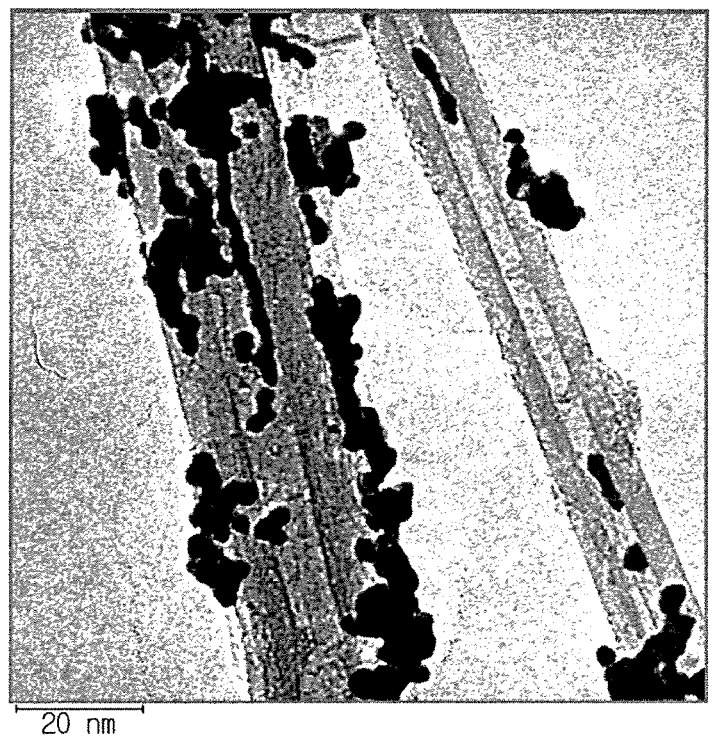
FIG. 12c is yet another partial magnification of the TEM micrograph of FIG. 11.
Figure 12D:
FIG. 12d is still another partial magnification of the TEM micrograph of FIG. 11.

Transmission electron microscope (TEM) micrographs of the catalyst support obtained using the process described above, are shown in FIGS. 11 and 12a through 12d. FIG. 11 shows the state of the platinum catalyst supported on the short carbon nanotubes according to one embodiment of the present invention. FIGS. 12a through 12d show partial magnifications of the TEM micrograph of FIG. 11, and as can be seen from the figures, many platinum particles are formed on the outer walls as well as the inner walls and ends of the carbon nanotubes.

Example 6

A catalyst support was produced using the Ag-metal particle-containing short carbon nanotubes obtained in Example 3.

First, 0.25 g of the short carbon nanotubes was added to 100 ml of distilled water and 100 ml of ethylene glycol, and the mixture was subjected to ultrasonic dispersion. A platinum precursor solution was added to the dispersion, and the resulting mixture was stirred at 110° C. to reduce the platinum precursor. Subsequently, the mixture was washed, filtered and dried in vacuum at 80° C. for 24 hours to produce Pt/CNT (carbon nanotubes).

The platinum catalyst was supported in the short carbon nanotubes. Platinum catalyst particles were located on the outer and inner walls and ends of the carbon nanotubes.

Example 7

A fullerene ($C_{60}$)-encapsulating CNT composite material was produced using the short carbon nanotubes obtained in Experimental Example 1 above.

Figure 13:
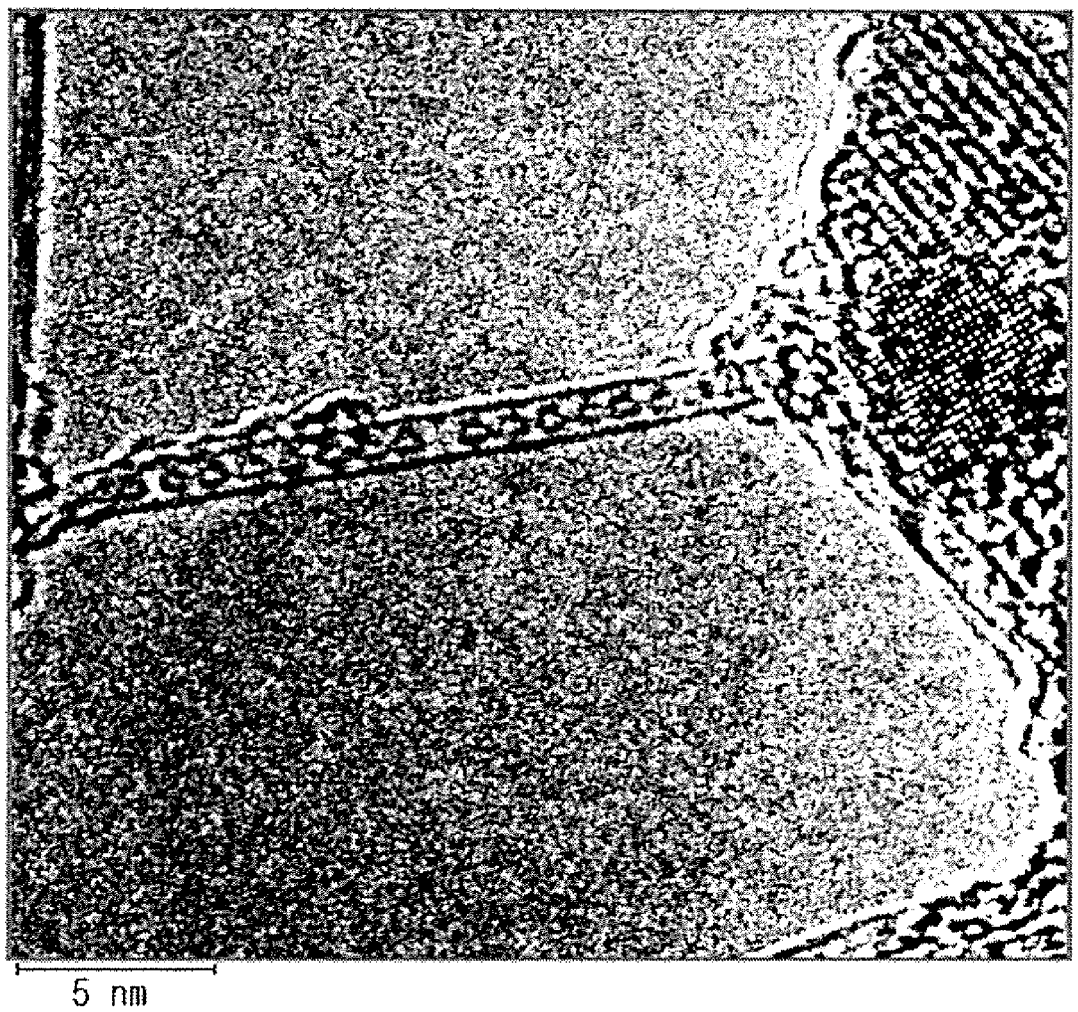
FIG. 13 is a TEM micrograph of carbon nanotube structures encapsulating fullerene prepared according to Example 6.

First, 0.1 g of the short carbon nanotubes was added to 30 ml of a toluene solution saturated with fullerene, and the mixture was subjected to ultrasonic treatment for 10 minutes. Then, the resulting mixture was filtered, washed and dried to yield a peapod structure in which the fullerene was inserted into the carbon nanotubes. The TEM micrograph of FIG. 13 shows that fullerene molecules fill the inner walls of the carbon nanotubes.

Short carbon nanotubes according to the present invention contain less amorphous carbon, and thus can maintain mechanical and electrical characteristics inherent in carbon nanotubes. The short carbon nanotubes can be produced through simple processes performed at cryogenic temperatures rather than at room temperature. When various active substances are supported or encapsulated in the short carbon nanotubes, the short carbon nanotubes can be effectively used in a variety of applications such as catalyst supports for fuel cells and the like.

While certain exemplary embodiment of the present invention have been illustrated and described, it will be understood by those of ordinary skill in the art that various changes and modifications may be made to the described embodiments without departing from the spirit and scope of the present invention as defined by the following claims.

What is claimed is:

1. A method of cutting carbon nanotubes comprising mechanically treating a carbon nanotube source material at a temperature of about 0° C. or lower, wherein the carbon nanotube source material comprises a mixture of carbon nanotubes and metal particles, wherein the metal particles comprise a metal selected from the group consisting of Ag, Au, Pt, Pd, Ni, Fe, Cu, Zn, Ti, In, Al, Ge and mixtures thereof, wherein the metal particles have diameters ranging from about 5 to about 100 μm, and wherein after mechanical treatment, the carbon nanotubes have an average length of about 1 μm or less.

2. The method of claim 1, wherein the mechanical treatment is performed at a temperature ranging from about −200° C. to about −100° C.

3. The method of claim 1, further comprising using a compound selected from the group consisting of liquefied nitrogen, liquefied oxygen and liquefied air to achieve the temperature of about 0° C. or lower.

4. The method of claim 1, wherein the mechanical treatment is performed using a ball milling apparatus.

5. The method of claim 1, wherein the mechanical treatment is performed for a period of time ranging from about 0.1 to about 2 hours.

6. The method of claim 1, wherein the mechanical treatment is continuously performed.

7. The method of claim 1, wherein the mechanical treatment is non-continuously performed.

8. The method of claim 1, wherein the carbon nanotube source material comprises carbon nanotubes having an average length ranging from about 0.5 to about 500 μm.

9. The method of claim 1, wherein the carbon nanotube source material comprises a material selected from the group consisting of powders, solutions and dispersions.

10. The method of claim 1, further comprising introducing a functional group to the carbon nanotubes.

11. The method of claim 10, wherein the functional group is selected from the group consisting of —SH, —NH$_2$, —NHCO, —OH, —COOH, —F, —Br, —Cl, —I, —NRH, —OR, —S—R, —CO, —COCl and —SOCl, wherein R is selected from the group consisting of alkyl groups and aryl groups.

* * * * *